(12) United States Patent  
Hansen et al.

(10) Patent No.: US 9,330,352 B2
(45) Date of Patent: *May 3, 2016

(54) DURABLE RFID TAG

(71) Applicant: Syntag Manufacturing LLC, Indianapolis, IN (US)

(72) Inventors: Peter J. Hansen, Fishers, IN (US); Brandon C. Greenberg, Indianapolis, IN (US)

(73) Assignee: Syntag Manufacturing, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,655

(22) Filed: Jun. 30, 2014

(65) Prior Publication Data

US 2014/0306017 A1    Oct. 16, 2014

Related U.S. Application Data

(63) Continuation of application No. 13/054,232, filed as application No. PCT/US2009/037150 on Mar. 13, 2009, now Pat. No. 8,763,910.

(60) Provisional application No. 61/080,821, filed on Jul. 15, 2008.

(51) Int. Cl.
*G06K 19/06* (2006.01)
*G06K 19/077* (2006.01)
*G06K 19/04* (2006.01)

(52) U.S. Cl.
CPC ........ *G06K 19/07728* (2013.01); *G06K 19/041* (2013.01); *G06K 19/07749* (2013.01); *G06K 19/07758* (2013.01); *Y10T 29/49002* (2015.01)

(58) Field of Classification Search
None
See application file for complete search history.

(56) References Cited

U.S. PATENT DOCUMENTS

| | | | |
|---|---|---|---|
| 6,036,099 | A | 3/2000 | Leighton |
| 6,265,977 | B1 | 7/2001 | Vega et al. |
| 6,424,315 | B1 | 7/2002 | Glenn et al. |
| 6,991,175 | B1 | 1/2006 | Huang |

(Continued)

FOREIGN PATENT DOCUMENTS

| | | |
|---|---|---|
| JP | 2007191545 | 8/2007 |
| JP | 2007216586 | 8/2007 |

OTHER PUBLICATIONS

Intermec(R), IT65 Small Rigid Tag Product profile, 4 pages, electronically retrieved and downloaded Feb. 4, 2016.

(Continued)

*Primary Examiner* — Michael G Lee
*Assistant Examiner* — Tabitha Chedekel
(74) *Attorney, Agent, or Firm* — John V. Daniluck; Bingham Greenebaum Doll LLP

(57) ABSTRACT

Plastic asset identification tags are described. The tags define an attachment feature by which the tag is attached to the asset. The tag also defines a cavity or slot in which an RFID transceiver is placed. Epoxy fills the remainder of the slot or cavity. The RFID transceiver is programmed to respond to interrogation by transmitting a unique identifier that is associated with the object to which the tag is attached. Additional information about the object may also be responsively transmitted, and in some embodiments that additional information is also written on the outside of the tag. Other tags seal the RFID transceiver within a pocket of flexible fabric-supported PVC.

62 Claims, 3 Drawing Sheets

(56) References Cited

U.S. PATENT DOCUMENTS

| | | |
|---|---|---|
| 7,049,962 B2 | 5/2006 | Atherton et al. |
| 7,259,678 B2 | 8/2007 | Brown et al. |
| 8,763,910 B2 * | 7/2014 | Hansen ................ G06K 19/041 235/487 |
| 8,794,531 B2 | 8/2014 | Ritamaki et al. |
| 2005/0221704 A1 | 10/2005 | Conwell et al. |
| 2006/0290505 A1 | 12/2006 | Conwell et al. |
| 2006/0290514 A1 | 12/2006 | Sakama et al. |
| 2007/0252702 A1 | 11/2007 | Wulff et al. |
| 2007/0279202 A1 | 12/2007 | Lionetti |

OTHER PUBLICATIONS

Simply RFID Product Datasheet, 2008, 5 pages, retrieved and downloaded Feb. 4, 2016.

Confidex Halo(TM) Product Datasheet, 2 pages, retrieved and downloaded Feb. 4, 2016.

Omni-ID(r) Product Datasheet, Apr. 2013, 4 pages, retrieved and downloaded Feb. 4, 2016.

Confidex Ironside (TM) Product Datasheet, 9 pages, retrieved and downloaded Feb. 4, 2016.

* cited by examiner

DURABLE RFID TAG

REFERENCE TO RELATED APPLICATION

This application claims priority to U.S. Provisional Application No. 61/080,821, filed on Jul. 15, 2008 and International Application No. PCT/US2009/037150 filed on Mar. 13, 2009. The entireties of these applications are hereby incorporated by reference.

FIELD

Some embodiments disclosed herein relate to an identification tag. More specifically, some embodiments relate to a tag bearing data retrievable by radio frequency stimulation.

BACKGROUND

The United States Occupation Safety and Health Administration (OSHA) requires chains and certain heavy equipment used in industrial settings to carry an identifying tag. The tag is stamped or engraved with identifying information, such as a serial number, model number, and other characteristics. Standard descriptive and/or warning text is engraved, molded, or embossed in the tag. Such tags are often made of steel or other durable metal.

Unfortunately, these industrial identification tags often deform in the face of typical industrial use. For example, when a chain is dragged behind a vehicle over the road, run over, or struck against a metal structure, or even where it might be subjected to intentional stress such as shot peening, the tags on these chains are often deformed beyond recognition (certainly beyond accurate, useful reading of data on its surface). Then, in order to comply with regulations, the tag must be replaced before the chain or equipment is used again.

There is a need, therefore, for more durable tags from which the necessary information can be read even after exposure to sometimes extreme stresses in industrial environments.

In addition, maintenance and use of industrial tags requires regular checking for the presence and proper condition of the tags. There is, therefore, also a need for convenient methods for checking industrial tags for function and legibility.

SUMMARY

It is, therefore, an object of some forms of the invention to provide a more durable identification tag.

It is also an object of some forms of the invention to provide a tag for chains and heavy equipment in industrial settings, where the tag carries information that is readable without physically contacting the tag even after the tag is subjected to high stresses of industrial use.

DESCRIPTION

For the purpose of promoting an understanding of the principles of the invention, reference will now be made to certain embodiments illustrated in the disclosure, and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Generally, one form of the present invention is a durable identification tag made of a flexible plastic material, and in which an RFID transceiver is embedded. The tag is applied to a chain, heavy equipment, or other uniquely identified object. Another form is a thin, flexible tag that includes a sealed pocket holding an RFID transceiver. This tag is sewn onto a sling, rope, or other device to facilitate management of that asset and data about that asset.

Figure 1:
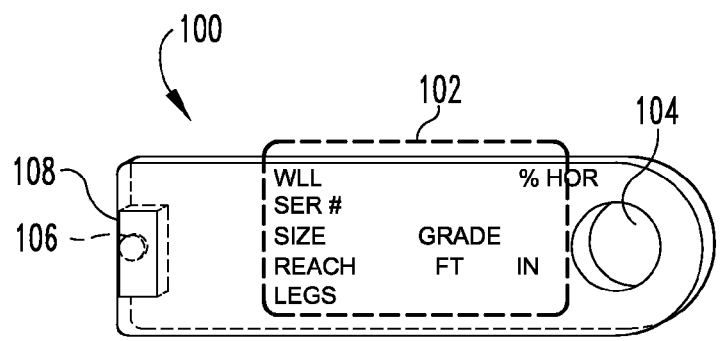
FIG. 1 is a perspective view of an identification tag according to a first embodiment.

Turning now to the embodiment illustrated in FIG. 1, tag 100 includes an information-bearing surface 102, through-hole 104, RFID transponder 106, and transponder embedding cavity 108. Information-bearing region 102 is engraved with information about the item to which tag 100 is attached. In the illustrated embodiment, that object is a chain, and the displayed information includes the working load limit (WLL), serial number, size, grade, reach in feet and inches, and number of legs of the chain. In some applications, additional information about the chain, such as acquisition date and source, maintenance records, and the like, is maintained in separated paper and/or electronic records. In other embodiments, such additional information is encoded on the RFID transponder 106 instead of or in addition to the information engraved in information-bearing surface 102.

RFID transponder 106 is positioned in transponder embedding cavity 108 as will be discussed further below. In the exemplary embodiment, the RFID transponder 106 is an INFOCHIP RFID chip manufactured and distributed by Info-Chip Systems, Inc., of Wetaskiwin, Alberta, Canada. In other embodiments, alternative RFID transponders are used. For example, RFID transponder 106 in various embodiments is active, semi-passive, or passive. Various transponders will have an integrated antenna, an external antenna, or both. The data provided by the RFID transponder 106 in various embodiments is loaded into the transponder 106 before it is placed within tag 100, after it is inserted into transponder receiving cavity 108, or repeatedly over time by remote means as will be understood by those skilled in the art in view of the present disclosure.

Figure 2:
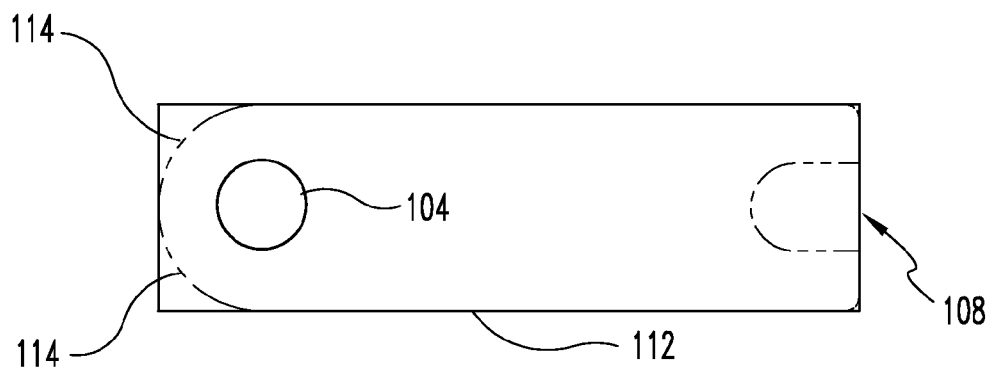
FIG. 2 is a plan view of the embodiment of FIG. 1.

Turning to FIG. 2, a plan view of tag 100 is presented, and will be referred to in a description of the fabrication of tag 100. In this exemplary fabrication method, a sheet of plastic is prepared into rectangular sheets about 5 inches long, 1.5 inches wide, and 0.25 inch thick. The overall shape varies from one embodiment to another, but this embodiment includes rounded corners 114 and through hole 104. A laser, such as model V460-60 produced by Universal Laser Systems Inc. of Scottsdale, Arizona, takes a computer-readable graphics file as input and generates the outer contour accordingly, including curves 114. The laser also produces through hole 104 and engraves the identifying and characteristic information into information-bearing surface 102 as illustrated in FIG. 1.

Transponder embedding cavity 108 is then created in the end of tag 100. In some embodiments, cavity 108 is created by a rotary bit, by laser, or by other methods that will occur to those skilled in the art based upon the present disclosure. Cavity 108 may be deep enough within the volume of tag 100 so that impact on the surface of tag 100 is unlikely to damage the RFID transponder 106.

The remaining space in transceiver cavity 108 is then filled. Abundant options will occur to those skilled in the art in the selection of materials with which to fill that space, but one suitable example is a 2-part epoxy casting resin (RESINLAB EP 965 LVLX Black), available for example from Ellsworth Adhesives in Germantown, Wisconsin. Alternative filling materials include LOCTITE HYSOL E-30CL, RESINLAB EP 1046 FG or RESINLAB EP 1121, or 3M SCOTCH-WELD Structural Plastic Adhesive DP-8005, all available from Ellsworth Adhesives. The epoxy is inserted into cavity 108 after transponder 106, then cures at room temperature for one hour to a semi-rigid polymer state. Various materials are selected for different use cases, considering void penetration, wetting and adhesion properties, void penetration, air release, and finish to a smooth, high-gloss surface. Other factors include resistance to water, acids, bases and most organic solvents, ensuring that the RFID transponder 106 is protected from many physical threats. Of course, other fill substances meet other design goals and will occur to those skilled in the art in light of the present disclosure.

In this exemplary embodiment, the body of tag 100 is fabricated from NYLATRON GS from DSM Engineering Plastic Products in Reading, Pennsylvania. Other embodiments are injection molded from DSM's STANYL TW363, or ZYTEL ST801AW NC010 from DuPont. Those skilled in the art will find PVC, acrylics, and other plastics suitable for various applications.

The tag 100 in this exemplary embodiment is UV-resistant and durable through high temperatures, sun exposure, water exposure, and other natural threats to its integrity. In this embodiment, after the fill substance in cavity 108 is set, the chip is encoded with information. In some embodiments, the information encoded into transponder 106 is precisely the data engraved in information-bearing surface 102. In others, only the serial number is stored in transponder 106, while in still others additional recordkeeping information is stored.

Figure 3:
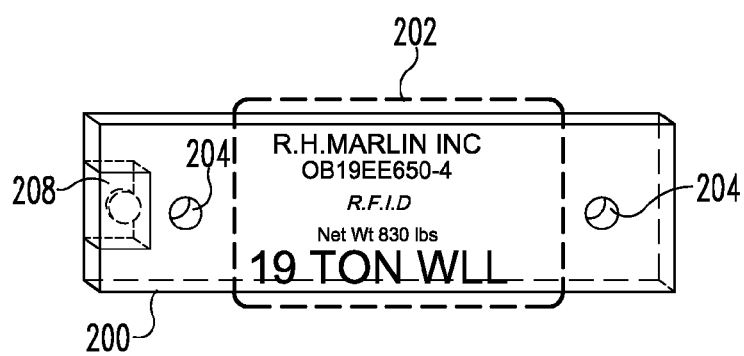
FIG. 3 is a perspective view of an identification tag according to a second embodiment.

A second embodiment is shown in FIG. 3. In this variation, tag 200 includes information-bearing region 202 and through-holes 204. Through-holes 204 enable the attachment of tag 200 to identified objects by mechanical looping. An RFID transponder is embedded in tag 200 in another transponder-placement region 208, though neither an RFID transponder nor the transponder-placement region is shown in FIG. 3.

Figure 4:
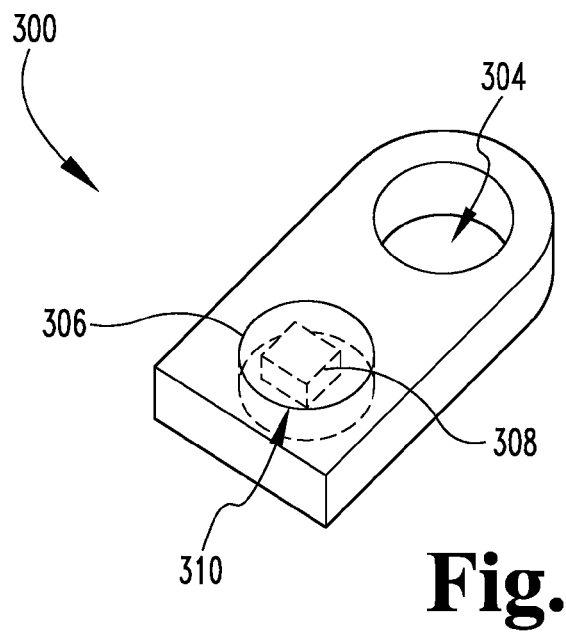
FIG. 4 is a perspective view of an identification tag according to a third embodiment.

FIG. 4 illustrates another embodiment, suitable for situations when legible writing on the outside of the tag is not needed. In this embodiment, tag 300 comprises body 302, which defines through-hole 304 and cavity 306. Transceiver 308 is placed within cavity 306, and the remainder of cavity 306 is filled with epoxy 310. This embodiment can be made very small (relative to the size of RFID transceiver 308).

Figure 5:
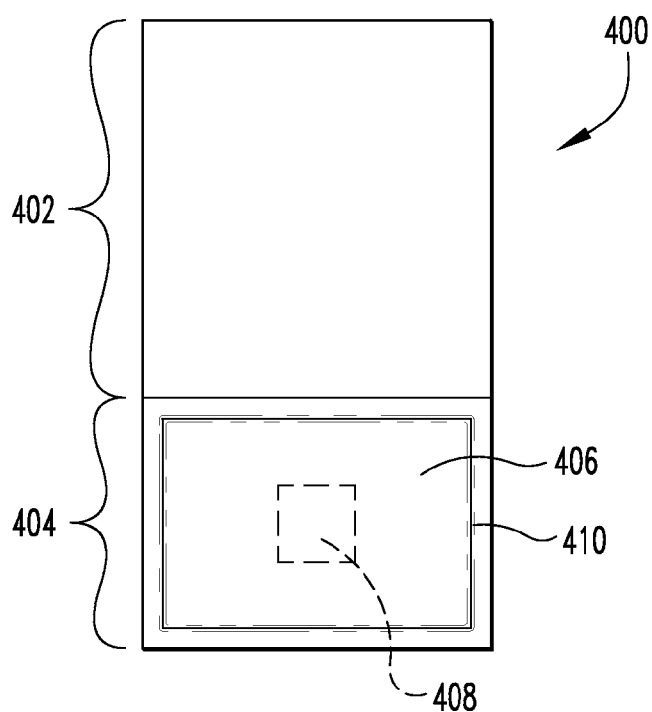
FIG. 5 is a plan view of an identification tag according to a fourth embodiment.

FIG. 5 illustrates another embodiment, tag 400. In this embodiment, tag 400 is made primarily of 18-pound, fabric-supported PVC sheets. Tail portion 402 in this embodiment merely provides a rectangular area that is useful for attachment to an object as will be discussed further in relation to FIG. 6, below. Head portion 404 includes a multi-layer pocket 406 in which RFID transceiver 408 is placed. After that placement, pocket 406 is RF-welded shut along closed path 410. Other closure techniques may be used in alternative embodiments, as will occur to those skilled in the art in view of the present disclosure. As shown in these embodiments, the RF-weld along path 410 makes pocket 406 substantially waterproof. The data available through RFID transceiver 408 in this embodiment can be any of the options described in relation to the embodiments above, or others as will occur to those skilled in the art in view of this disclosure.

Figure 6:
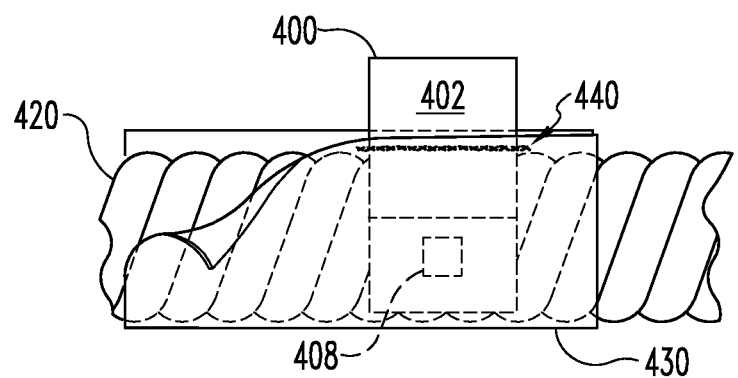
FIG. 6 is a perspective view of an identification tag according to the fourth embodiment as it is being affixed to an industrial lifting device.

FIG. 6 illustrates one way in which tag 400 can be affixed to certain assets. In this illustration, object 420 is a part of the asset, such as a strap, rope, sling, cable, or the like. Capacity label 430 is wrapped around object 420 and over tag 400, then is sewn along stitching line 440 using durable nylon thread or the like. The stitching crosses the edge of capacity tag 430 and upper portion 402 of tag 400, thereby affixing both identification tag 400 and capacity tag 430 to object 420. Conventional capacity tags 430 are of a dimension and quality that allows RFID transceiver 408 to be queried from a suitable distance.

Alternative Fabrication Technique

An alternative method for fabricating tags 100, 200, and 300 involves injection molding techniques. This process begins with resin in pellet form and ultraviolet-resistant dye, each of which is dried using conventional techniques to remove moisture in advance of the injection molding process. In some embodiments, the resin and dye are dried to about 0.01% moisture, while in other embodiments, the threshold is set at some other value less than or equal to 0.05%. The plastic resin and dye are then blended and loaded into a hopper for screw injection molding. Of course, in other embodiments, other types of molding will be used as will occur to those skilled in the art in view of the present disclosure.

During the molding process, the dyed resin is injected into a die to form the tag body, including defining the slot, or cavity, and any text and/or symbols that are to appear on information-bearing surface 102. The injection dies in this embodiment are water-cooled, and once the plastic is injected, the dies are cooled and the tag is ejected from the die. In other embodiments, multi-cavity dies are used to form multiple tags (having the same or different shapes and/or markings simultaneously).

The tags are then "seasoned" by exposure to greater levels of humidity until their moisture content reaches about 2.7%. In other embodiments, of course, other moisture content thresholds will be used, as will occur to those skilled in the art in view of this disclosure. RFID transceiver chips are then inserted into the slot that was molded into each tag, and the remainder of the slot is filled with epoxy.

Additional information to be added to information-bearing surface 102 can be written using hand stamping, vibratory etching, laser etching, or screen printing. Other methods of writing data on the outside of the tag so that it is visible and legible will occur to those skilled in the art in view of the present disclosure.

Testing

Tags made according to the first exemplary embodiment above have been put through a shot peening chamber 250 consecutive times, placed under a concrete block and jerked out 15 times, then run over with a forklift 5 times, and placed on a chain and dragged behind a vehicle on the highway for over 2 hours. The RFID transceiver in each tag still functioned as intended.

Another tag made according to the first exemplary embodiment above was exposed to 65,000 pounds of pressure asserted perpendicular to the large side that includes information-bearing surface 102. Though the text on the tag was somewhat deformed, it was still legible (it was primarily just larger than it had been), and the RFID transceiver still worked.

Figure 7:
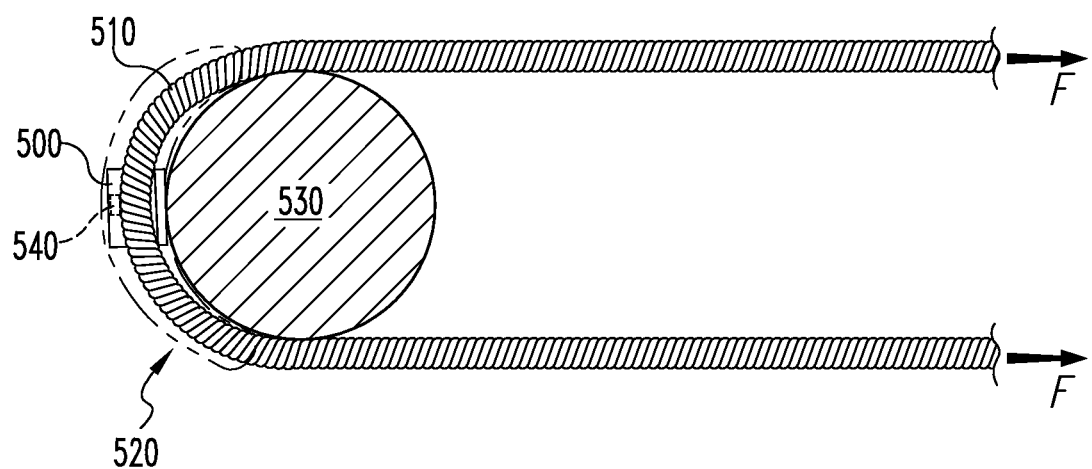
FIG. 7 is a schematic view of a test configuration applied to an identification tag according to the fourth embodiment.

As illustrated in FIG. 7, a tag 500 of the form illustrated in FIGS. 5-6 was attached to an industrial-grade sling 510, and a length-wise strain force F was imposed lengthwise on each end of the sling 510. The point at which the tag 500 was affixed to the sling 510 was placed outside the bight 520 in the sling 510, within the protective sheath of the sling 510 on the side opposite post 530. A pulling force of 2F=45,000 pounds was applied, and the RFID transceiver 540 in tag 500 still functioned.

While the inventions have been illustrated and described in detail in the drawings and foregoing description, the same is to be considered as illustrative and not restrictive in character, it being understood that the preferred embodiment has been shown and described and that changes and modifications that come within the spirit of the invention are desired to be protected.

What is claimed is:

1. A method, comprising:
  molding resin to form a tag that has a body and a slot that opens to the outside of the tag body;
  curing the resin tag;
  placing an RFID transceiver in the slot;
  receiving a stimulus signal at the RFID transceiver;
  transmitting an answer signal encoding data associated with a unique identifier, the transmitting being in response to the receiving; and
  attaching the tag to an industrial asset, wherein the answer signal includes information associated with the asset.

2. The method of claim 1, wherein the resin is treated to substantially prevent natural degradation of the plastic material when exposed to sunlight, and the method further comprising:
  texturing at least a portion of the surface of the slot; and
  depositing a material in the slot to substantially cover the RFID transceiver.

3. The method of claim 1, wherein the tag is adapted and configured to be attached by at least one of a chain, strap, rope, sling, or cable to an object, and further comprising writing information about the object on the outside of the tag.

4. The method of claim 1 wherein said molding resin has at most about 0.01 percent moisture, and wherein said curing is to increase the moisture content to at least about 2 percent.

5. The method of claim 1 wherein the body includes a pass-through hole, and said attaching is with the pass-through hole.

6. The method of claim 1 wherein the body includes a pair of spaced apart pass-through holes, and said attaching is with the pass-through holes by at least one of a chain, strap, rope, sling, or cable.

7. The method of claim 6 wherein the slot is not located between the pass-through holes.

8. The method of claim 1 wherein the slot is an air pocket that protects the RFID transceiver from crushing damage.

9. The method claim 1 wherein the unique identifier is a serial number, and which further comprises printing the serial number on an outer surface of the tag body, and the answer signal includes the serial number.

10. The method of claim 1 which further comprises rifling at least a portion of the surface of the slot.

11. The method of claim 1 which further comprises injecting an adhesive material in the slot to cover the RFID transceiver.

12. An industrial asset tag for attachment to an industrial asset, comprising:
  a tag body having a cavity and an outer surface and being adapted and configured for attachment to the industrial asset, said tag body including an asset identifier printed on the outer surface of the tag body; and
  an RFID transceiver disposed in the cavity, the RFID transceiver not being exposed along the outer surface, the RFID transceiver being configured to transmit an answer signal encoding data associated with a unique identifier in response to receiving a stimulus signal, the answer signal encoding at least some of the asset identifier, wherein the asset identifier includes data about the asset.

13. The tag of claim 12, further comprising an adhesive material filling substantially all of the portion of the cavity not occupied by the RFID transceiver, wherein the adhesive material and the body conjointly prevent ambient water from reaching the RFID transceiver.

14. The tag of claim 12, wherein the tag body is formed of a plastic material that has been treated to reduce the natural deterioration of the plastic material.

15. The tag of claim 12, wherein the tag body includes a through-hole, the tag further comprising an object passing through the through-hole, wherein a text description of a characteristic of the object is written on the outer surface of the body.

16. The tag of claim 15, wherein: the object is one of a chain, strap, rope, sling, or cable, and the asset identifier is a serial number associated with the object.

17. The tag of claim 12 wherein the data includes at least one of a serial number pertaining to the asset and the working load limit.

18. The tag of claim 12 wherein the tag body includes a first pass-through hole and a second pass-through hole spaced apart from the first pass-through hole, wherein the cavity is not located between the first and second pass-through holes.

19. The tag of claim 12 wherein each of first and second pass-through holes are adapted and configured for looping connection to at least one of a chain, strap, rope, sling, or cable.

20. The tag of claim 12 wherein the cavity is textured.

21. The tag of claim 12 wherein said RFID transceiver includes an integrated antenna.

22. The tag of claim 12 wherein said RFID transceiver includes an external antenna.

23. The tag of claim 12 wherein said tag body includes a pass-through hole.

24. The tag of claim 23 wherein the body is constructed of a plastic material and said RFID transceiver is bonded to the cavity by an adhesive.

25. The tag of claim 12 wherein the surface of the cavity is rifled, and the cavity is an air pocket that protects the RFID transceiver from crushing damage.

26. The tag of claim 12 wherein the data about the asset is a serial number associated with the asset.

27. The tag of claim 12 wherein the answer signal includes the serial number.

28. The tag of claim 27 wherein the serial number is printed on an external surface of the tag body.

29. An industrial asset tag, comprising:
  a tag body defining a cavity and a pair of spaced apart pass-through holes adapted and configured for attaching said tag body to the industrial asset, a majority of the cavity not being located between the pass-through holes, an asset identifier being printed on an outer surface of the tag body, wherein the asset identifier includes data about the industrial asset; and an RFID chip in the cavity, the RFID chip not being exposed along the outer surface, wherein said RFID chip transmits an answer signal that encodes a unique identifier associated with the industrial asset after receipt of a stimulus signal.

30. The tag of claim 29, further comprising an adhesive material in the cavity and adhering the RFID chip to the tag body, wherein the adhesive material and the body conjointly prevent ambient moisture from reaching the RFID transceiver.

31. The tag of claim 29, which further comprises an antenna external to said RFID chip.

32. The tag of claim 29, in combination with an object passing in a loop through each of the through-holes, and the object is one of a chain, strap, rope, sling, or cable.

33. The tag of claim 29, wherein: the industrial asset is at least one of a chain, strap, rope, sling, or cable, and the identifier is a serial number associated with the industrial asset.

34. The tag of claim 29 wherein the asset identifier includes at least one of working load limit, serial number, size, grade, length of reach, number of legs of the chain, acquisition date and source.

35. The tag of claim 29 wherein a surface defining the cavity is textured.

36. The tag of claim 29 wherein the cavity has a rifled surface.

37. The tag of claim 29 wherein the cavity is an air pocket that protects the RFID transceiver from crushing damage, and an adhesive material in the cavity adheres the RFID chip to the tag body.

38. The tag of claim 29 wherein the body is constructed of a plastic material, and the unique identifier is a serial number.

39. The tag of claim 38 wherein the serial number is printed on the outside of the tag body.

40. The tag of claim 29 wherein said RFID chip includes an external antenna.

41. The tag of claim 29 wherein said RFID chip includes an integrated antenna.

42. An industrial asset tag for attachment to an industrial asset, comprising:
a tag body having a cavity and an outer surface, and including a through-hole adapted and configured for attachment of the tag body to the industrial asset, said tag body including a serial number visibly and legibly printed on the outer surface of the tag body; and
an RFID transceiver disposed in the cavity, the RFID transceiver being maintained in the cavity by an adhesive, the RFID transceiver not being exposed along the outer surface, the RFID transceiver being configured to transmit an answer signal in response to receiving a stimulus signal, the answer signal encoding the same serial number.

43. The tag of claim 42, further comprising an adhesive material filling substantially all of the portion of the cavity not occupied by the RFID transceiver, wherein the adhesive material and the body conjointly prevent ambient water from reaching the RFID transceiver.

44. The tag of claim 42, wherein the tag body is formed of a plastic material.

45. The tag of claim 42, wherein the industrial asset is one of a chain, strap, rope, sling, or cable, and the serial number is associated with the industrial asset.

46. The tag of claim 42 wherein through-hole is a first through hole, and which further a second pass-through hole spaced apart from the first pass-through hole, wherein the cavity is not located between the first and second pass-through holes.

47. The tag of claim 42 wherein each of the first and second pass-through holes are adapted and configured for looping connection to at least one of a chain, strap, rope, sling, or cable.

48. The tag of claim 42 wherein the tag body is constructed of a plastic material, and the serial number relates to additional information about the industrial asset maintained in an electronic record.

49. The tag of claim 42 wherein said RFID transceiver includes an integrated antenna.

50. The tag of claim 42 wherein said RFID transceiver includes an external antenna.

51. The tag of claim 42 wherein the surface of the cavity is rifled, and the cavity is an air pocket that protects the RFID transceiver from crushing damage.

52. An industrial asset tag, comprising:
a tag body defining a cavity and a pair of spaced apart pass-through holes adapted and configured for attaching said tag body to the industrial asset, a portion of the cavity not being located between the pass-through holes, a serial number being visibly and legibly printed on an outer surface of the tag body; and
an RFID chip in the cavity, the RFID transceiver being maintained by an adhesive in the portion of the cavity not located between the pass-through holes, the RFID chip not being exposed along the outer surface, wherein said RFID chip transmits an answer signal that transmits the same serial number after receipt of a stimulus signal.

53. The tag of claim 52 wherein the adhesive material and the body prevent ambient moisture from reaching the RFID transceiver.

54. The tag of claim 52, which further comprises an antenna external to said RFID chip.

55. The tag of claim 52, in combination with an object passing in a loop through each of the through-holes.

56. The tag of claim 52, wherein the object is at least one of a chain, strap, rope, sling, or cable and the serial number is associated with the object.

57. The tag of claim 52 wherein a surface defining the cavity is rifled.

58. The tag of claim 52 wherein the tag body is constructed of a plastic material, and the serial number relates to additional information about the industrial asset maintained in an electronic record.

59. The tag of claim 52 wherein the cavity is an air pocket that protects the RFID transceiver from crushing damage.

60. The tag of claim 52 wherein the body is constructed of a plastic material.

61. The tag of claim 60 wherein the industrial asset is at least one of a chain, strap, rope, sling, or cable and the serial number is associated with the object.

62. The tag of claim 61 wherein the cavity is an air pocket that protects the RFID transceiver from crushing damage.

* * * * *